United States Patent Office 3,469,095
Patented Sept. 23, 1969

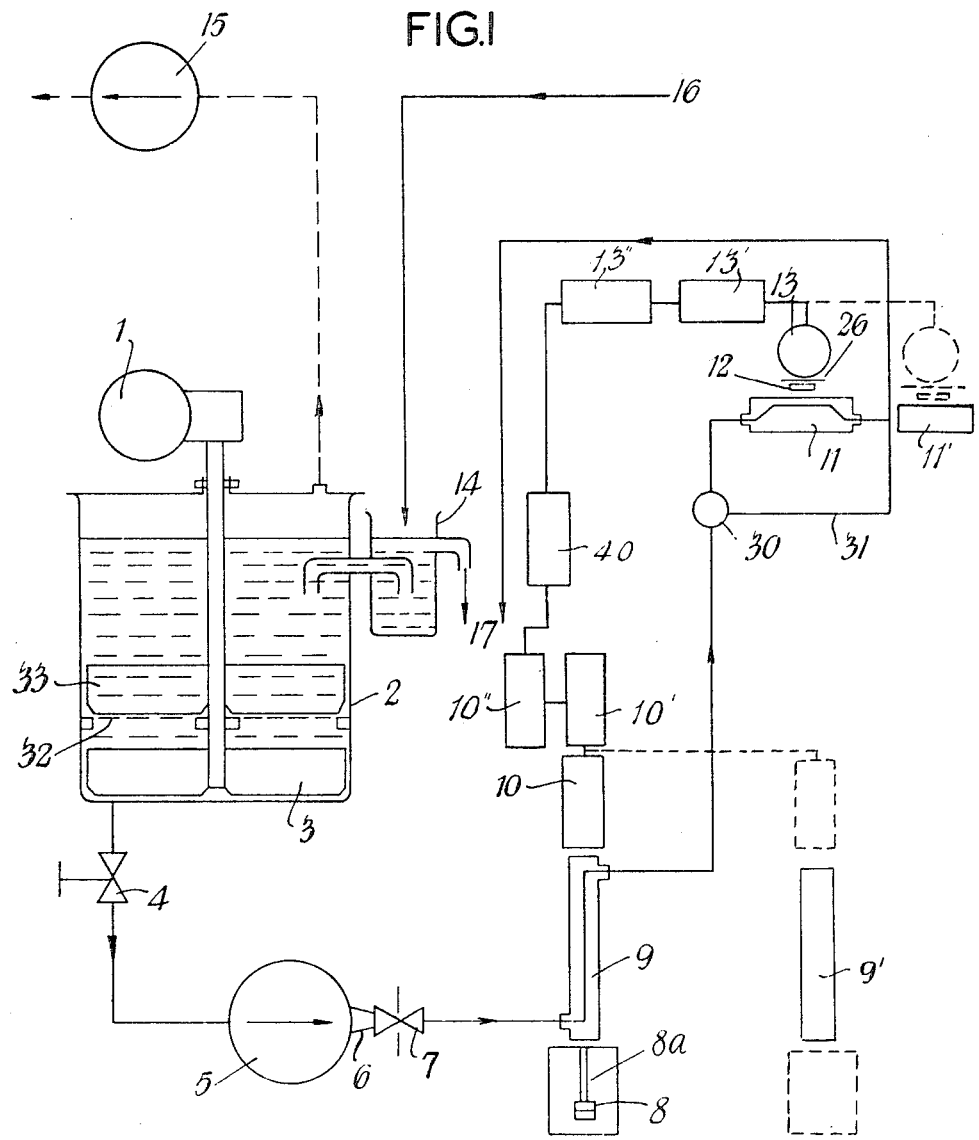

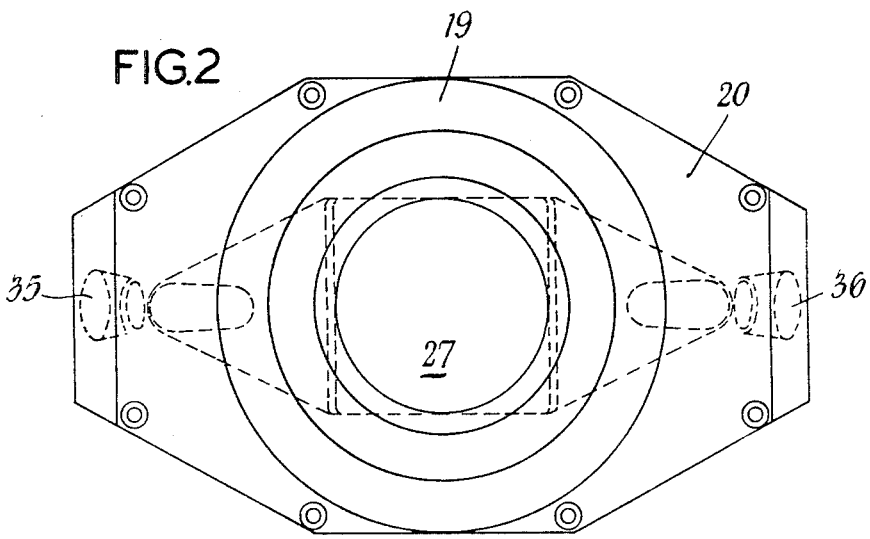
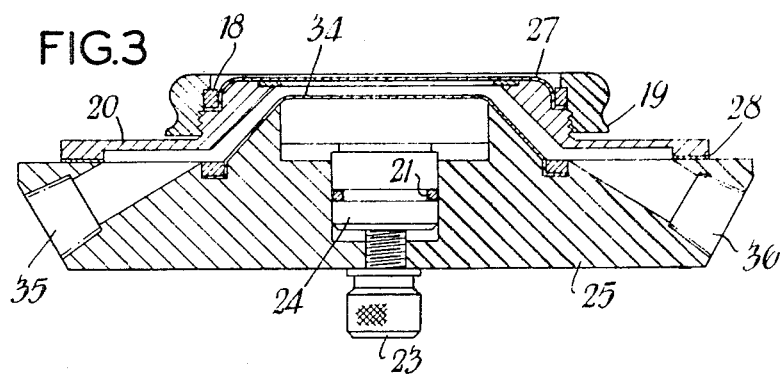
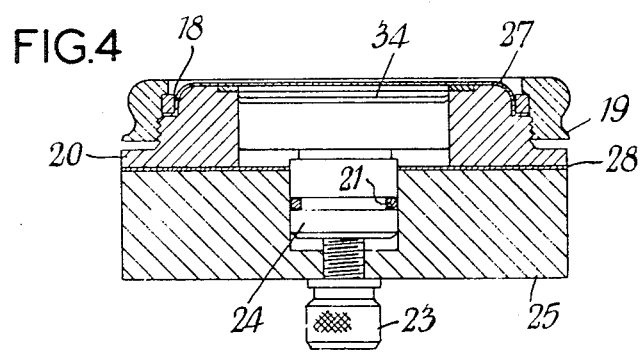

3,469,095
METHOD OF RADIOMETRIC ANALYSIS OF FINE SOLIDS SUSPENDED IN A LIQUID
Peter Edward Starnes, Earley, Reading, England, assignor to Hilger & Watts Limited, London, England, a British Company
Filed Apr. 5, 1965, Ser. No. 445,462
Claims priority, application Great Britain, Apr. 8, 1964, 14,580/64
Int. Cl. G01n 23/12
U.S. Cl. 250—43.5                21 Claims

ABSTRACT OF THE DISCLOSURE

A method of carrying out radiometric analysis of fine solids suspended in a liquid in which the density of the suspension is first deduced by causing the suspension to interact with a beam of electromagnetic radiation the photons of which principally have energies in the range 600–3000 kilo electron volts and by measuring the intensity of the radiation transmitted through the suspension for comparison with similar measurements on a reference standard. Thereafter the suspension is irradiated in an analysis chamber and the resulting radiation measured for comparison with similar measurements on a reference standard.

---

This invention is concerned with an improved method of, and apparatus for, the determination of the chemical composition of materials by means of radiometric analysis; that is to say by causing a sample of the material which is to be analysed to interact with an incident beam, or beams, of radiation of known characteristics, and detecting and measuring the characteristics of resultant radiation or radiations emanating from the sample.

The sample is required to be in the form of a fine powder dispersed in a liquid, preferably water, as a slurry and may be prepared in this way by a number of suitable known means, or may occur as such during processing.

In general it is necessary to make at least two radiometric measurements in order to obtain quantitative information relating to the chemical composition of a solid dispersed in a liquid. The first is a measurement of the attenuation by the slurry of a beam of radiation chosen so that its absorption by the slurry is a function of the density of the latter and substantially independent of its chemical composition. This usually requires that the radiation consists of electromagnetic radiation having an energy mainly in the range, 600–3000 kilo electron volts. This first measurement is used as a means of determining the solids content of the slurry so that information derived from the second measurement can be adjusted to correct for the effects of variation in this parameter. The second of these measurements is of radiation emanating from the sample material which is characteristic of the element, or elements, whose concentration it is desired to determined.

If the solids content of the slurry is known with sufficient accuracy, it may be possible to dispense with the first measurement, but this is not usually the case.

The first type of measurement referred to above will usually be achieved by determining the attenuation suffered by a beam of gamma rays consequent upon its transmission through a predetermined thickness of the sample material.

The second type of measurement will in general consist of one or more of the following:

(a) A measurement of the secondary radiation emitted from the sample in reflex geometry, that is with the radiation detector located so as to apprehend secondary radiation emitted from the sample material backwards through the source of primary radiation, suitable shielding being provided to eliminate said primary radiation from directly affecting the detector, (b) A measurement of either or both of the primary and secondary radiations emerging from the sample material in a direction more or less parallel to that of the incident primary radiation, and (c) A measurement of secondary radiation which is incident upon the detector from a cell or conduit enveloping or contained within the latter.

In practice measurements carried out as described under (a) and (b) above are used when the emission of the secondary radiation is instantaneous and measurements of the type described under (c) are used when there is a finite time delay between the absorption of the primary radiation and the emission of the secondary radiation to be measured so that interaction between the primary radiation and the sample material may take place in one cell or conduit while the measurement of the secondary radiation resulting from said interaction may be conveniently undertaken by a detector adjacent to a secondary cell or conduit.

The usual geometrical criteria relating to the accurate relative positions of the source of radiation, sample and radiation detectors must be met during these measurements if reliable quantitative information is to be obtained.

It is also desirable that means shall be available whereby measurements made upon radiation caused to emanate from the sample material can be compared with radiation caused to emanate from a reference standard or standards of known characteristics under similar conditions.

Since the sample is in the form of a liquid with solids in suspension, it must be contained during the measurements, in such a way as to satisfy the geometrical criteria referred to above. Furthermore, any parts of the apparatus through which either or both incident and resultant radiations must pass should be constructed of material chosen so as to cause the smallest practicable absorption of said radiation during its passage through it.

These two considerations imply that great care must be taken in the design and manufacture of the windows through which low energy radiations pass so as to avoid the possibility that the windows will stretch during operation with consequent alteration in the critical geometry. This problem is most acute when X-rays having an energy of less than 6 k.e.v. are being measured, as in this case, the thickness of the window is restricted by the necessity of preventing undue attenuation of the radiation transmitted through it.

For example, experiments have shown that in order to achieve the highest acuracy in the measurement of CaK X-rays emitted from cement raw material slurry, using a non-dispersive radioisotope fluorescence technique, the distance between the radiation detecor and the centre of the analysis cell window must be kept constant to within 0.01 inch. Since the maximum practicable window thickness in this case is 0.002 inch and it may be subjected to a pressure of some 10 p.s.i.g. over an area of approximately 4 square inches, the window must exhibit a very high resistance to stretching. It must also be resistant to abrasion and puncture by the coarser solid particles present in the dispersion. Our co-pending application No. 14,084/65 discloses means whereby X-ray windows having the required properties for use in the context may be produced.

Even when such a stretch-resistant window is used it has been found desirable to maintain the pressure inside the analysis cell substantially constant during operation so as to minimise errors caused by slight elastic deformation of the cell window. This can be achieved by the provision of a suitable pressure control device and by-pass system.

It is also important that the solids should be maintained in a state of suspension in the liquid during the measurements so that the solid particles which enter into interaction with the radiation truly represent the composition of the bulk of the sample. In this respect (as far as measurements of the second type beforementioned are concerned) it is necessary to take due account of the difference in size of the various solid particles present and the effects of such differences upon the radiometric measurements.

For example, it is known that in many cases the intensity of the fluorescent radiation characteristic of a component element emitted in given circumstances by a given sample of material in slurry form will depend upon the size of the solid particles so that said intensity will change if the particle size distribution of the solid phase changes even if its chemical composition remains constant.

Often this effect arises from the fact that coarse particles tend to be under-represented in radiometric composition determinations because of their relatively small surface to mass ratio.

One method of compensating for this type of error is to arrange for the average distance of approach of the coarser particles with respect to the detector window to be slightly less than that of the finer particles during the radiometric measurement. This may be accomplished by causing the slurry to change its direction of flow in an appropriate manner as it enters the field of measurement so that there is a tendency for the particles to separate according to their size under the influence of centrifugal force.

A second way of applying a similar correction is to arrange for a change in the velocity of flow of the slurry to take place as it enters the field of measurement. In this case different sizes of particles can be caused to pass through the analysis cell at different speeds. For example, by suitably reducing the flow cross-section at the entrance to the analysis cell the average velocity of flow of the slurry will be increased, but there will be a tendency for the larger particles to resist this acceleration to a greater degree than the fine ones, both by reason of their greater inertia and also because of the frictional forces involved. Thus the transit time of the larger particles through the analysis cell will be increased relative to that of the finer particles. Such a relative increase in transit time will result in a relative increase in the proportion of larger particles in the field of measurement. The magnitude of this increase can be adjusted by suitable control of the acceleration so as substantially to compensate for the tendency of the larger particles to be under-represented as hereinbefore described. On leaving the analysis cell the slurry may be subjected to an acceleration of equal magnitude but opposite sign to that imposed upon it on entry, so as to restore the original particle size distribuition throughout the circulating system.

Further, it should be noted that the presence of bubbles of air or other gas in the sample during the measurements is undesirable as it is likely to lead to errors in the interpretation of the measurements.

In order to ensure that the slurry or dispersion is substantially free from gas or vapour bubbles during the measurement, care must be taken, firstly, to remove any bubbles present before circulating it through the apparatus and, secondly, to avoid the possibility of any further bubbles being formed during circulation.

The first requirement can generally be met by gentle agitation of the dispersion with or without the application of reduced pressure, prior to admission to the circulating system.

The second requirement demands that the design of the circulating system is such as to avoid any likelihood of cavitation in the liquid phase, such as may be caused by a sudden reduction in pressure or the formation of a vortex and also that the pressure in the system is at all times and in all parts substantially in excess of the vapour pressure of liquid present in the dispersion at the operating temperature.

According to the present invention there is provided a method for carrying out radiometric analysis of fine solids suspended in a liquid, including the steps of feeding the suspension into a mixing tank and subjecting it therein to slow speed agitation with or without the application of reduced pressure; causing said suspension to flow through a density gauge wherein it is caused to interact with a beam of electromagnetic radiation, the photons of which principally have energies in the range 600–3000 kilo electron volts, the length of the flow path through said gauge being such as to provide optimum conditions for the measurement of the attenuation of said beam of radiation according to known principles and the velocity of flow being such as to prevent sedimentation or segregation taking place therein; measuring the intensity of the radiation transmitted through the suspension in said density gauge; comparing said measurement with a measurement of the intensity of the radiation transmitted through a reference standard under similar conditions and thereby deducing the density of the suspension; causing said suspension to flow through one or more cells or conduits under conditions of controlled pressure, velocity and flow pattern so that interaction producing radiation takes place between the suspension and primary radiation incident upon it and measuring the radiation resulting from said interaction, the relative positions of the source or sources of primary radiation, the cells or conduits and the radiation detector or detectors being accurately maintained during said measurement; comparing said resultant radiation with that produced during interaction between incident radiation from the same source or sources and a reference standard of known characteristics under similar conditions and combining the results of these latter measurements with results obtained from the density gauge measurements so as to allow for variations in the solids content of the sample material to obtain information relating to the chemical composition of the solids present in the suspension.

According to a further aspect of the invention, there is provided apparatus for carrying out the foregoing method including a mixing tank which is provided with means for the slow speed agitation of the slurry or suspension therein and is in communication with a circulating system incorporating a slurry circulating pump, a density gauge assembly and one or more cells or conduits, said system being provided with means whereby the flow through, and pressure within, the or each cell or conduit may be controlled; means for projecting a collimated beam of electromagnetic radiation composed principally of photons having energies in the range 600–3000 kilo electron volts through the said density gauge, while the said suspension is flowing through the latter, the length of the flow path through said gauge being such as to provide optimum conditions for the measurement of the attenuation of said beam of radiation according to known principles and the velocity of flow being such as to prevent sedimentation or segregation taking place therein, and for comparing the attenuation so produced with the attenuation of the same beam of radiation produced by a suitable reference standard, and means for causing interaction to take place between the suspension flowing through one or more analysis cells or conduits and primary radiation incident upon said suspension and measuring the resultant radiation under conditions whereby the relative positions of the source or sources of primary radiation, the cells or conduits and the radiation detector or detectors are accurately maintained during said measurement, and for comparing this measurement with that of the resultant radiation produced when a reference standard of known characteristics is irradiated in like manner by the same source of radiation under similar geometrical conditions.

Those parts of the apparatus through which low energy radiation is transmitted are conveniently made from a material of low absorption coefficient for the radiations concerned such as thin beryllium or aluminium sheet or foil or thin plastics material having the necessary resistance to stretching and abrasion.

In order that the invention may be more fully understood, one form of apparatus for carrying out radiometric analysis of fine solids dispersed in water or other suitable liquid, in accordance with the invention, will now be described, by way of example, with reference to the accompanying drawings, in which, FIGURE 1 is a part-sectional and partially diagrammatic elevation showing the major part of the apparatus, FIGURE 2 is a diagrammatic plan view of one type of analysis cell or conduit suitable for inclusion in the apparatus, FIGURE 3 is a diagrammatic elevation of the analysis cell conduit, and FIGURE 4 is a second diagrammatic elevation of the same analysis cell or conduit taken at right angles to that shown in FIGURE 3.

Referring now to the drawings, the illustrated apparatus is especially suited to the continuous radiometric analysis of a suspension of fine mineral materials in water particularly using non-dispersive radioisotope fluorescence techniques. To this end the apparatus incorporates a mixing tank 2, of approximately 1½ gallons capacity which is provided with concentric slow speed agitator paddles 3 and 33 driven by an electric motor 1, through a suitable reduction gear. The mixing tank is fitted with an airtight cover and means are provided for supplying slurry (i.e. a dispersion of fine solids in liquid) to the mixing tank via a constant level device 14, so designed as not to admit air into the tank. A pipe leading into the top of the tank is in communication with a vacuum pump 15 via flow control means. Some 2–3 inches above the bottom of the mixing tank is fitted a straining gauze assembly 32 which is sealed around its outer edge with a flexible seal. The shaft on which the paddles 3 and 33 are mounted passes through the centre of the straining gauze and a suitable seal is also provided around this edge of the gauze. The top paddle 33 is fitted with rubber blades so arranged as to wipe the top surface of the straining gauze with the object of preventing clogging. The function of the straining gauze is to prevent the admission to the circulating system, to be described, of coarse particles and fibres which may be present in the dispersion and which could damage the apparatus.

The bottom of the mixing tank is connected, through flow control means 4, to a slurry pump 5. This pump, which forms part of a circulation system, is in communication via a reducing section 6 and further flow control means 7, with a density gauge tube 9, and one or more analysis cells or conduit 11, connected in series by tubing. A pressure control device 30 and by-pass 31, ensure that the pressure is maintained substantially constant in each analysis cell or conduit during operation.

The density gauge tube is a vertical tube of constant bore closed at each end by a "window" of material of low absorption coefficient for gamma-rays. The distance between the inside faces of the windows is accurately known. The tube may be conveniently made from a number of separate sections each of accurately defined length, the sections being capable of being assembled in various combinations so that the tube length may be accurately adjusted by defined increments.

The density gauge tube is provided with side arms at each end through which the sample slurry respectively enters and leaves the tube during operation of the apparatus in such a way that the tube is kept full of slurry without there being dead pockets at the ends. The bore of the density gauge tube is such that during operation the velocity of the slurry through the tube is sufficient to prevent sedimentation or segregation occurring.

The analysis cell or conduit consists of a body 25 (FIGURES 2 to 4), which houses an adjustable plunger 24, over which is stretched a thin rubber diaphragm 34. The plunger is surrounded by a suitable seal 21 to prevent leakage. A thin plastic window 27 is fitted over a top plate 20 of the analysis cell or conduit which plate is itself bolted to the body 25, and is clamped into position by a retaining ring 18 which is secured by means of a threaded locking ring 19, to the top plate 20. A seal 28 is interposed between the top plate and the body.

The knurled knob 23 operates via a spindle in such a way as to produce vertical movement of the plunger 24 so that the clearance between the rubber diaphragm 34 and the cell window 27 can be adjusted. Conduits 35 and 36 provide means whereby slurry respectively enters and leaves the analysis cell. It will be understood that adjustment of the position of the plunger 24 provides means whereby the velocity and flow path of the slurry passing through the cell may be controlled, to provide partial or complete compensation for known particle size effects with a consequent improvement in the accuracy of the radiometric analysis.

The material from which the analysis cell is constructed must be chosen so as not to interact with the incident radiation in a way detrimental to the accuracy of the measurement. For this reason suitable, dimensionally stable, water-proof rigid plastic material is generally to be preferred.

The flow system described above and comprised by the mixing tank, density gauge pressure control device, a by-pass and the analysis cell or conduit together with the associated connections and flow control means, is carried upon a rigid support frame.

The rigid support frame also carries two sources of radiation 8 and 12. 8 is a shielded and collimated source of gamma radiation of energy mainly in the range 600–3000 kev. consisting of a preparation of a suitable radioisotope such as caesium-137, the collimator being indicated by 8a. The radiation detector associated with the source 8 is indicated by 10. 12 is a source of X-rays chosen to be appropriate to the particular analytical application for which the apparatus is to be used and may be conveniently in the form of a preparation of a suitable radioisotope such as iron-55 contained in a capsule and shielded to protect the associated raidation detector 13 from direct irradiation. Alternative isotopes include tritium or helium 3, strontium 85, cadmium 109, promethium 147 and americium 241. Means (not shown) are provided for interposing one or more energy selective filters 26, between the radiation detectors 13 and the source of radiation 12.

Either of the sources 8 and 12, may be used with or without an internal or external target to produce the desired emission.

The radiation detectors 10 and 13, associated with the density gauge and the analysis cell or conduit respectively, also depend from the rigid support frame and means are provided for accurately locating the sources of radiation and detectors in known positions with respect to the windows of the density gauge and analysis cell or conduit respectively and of accurately adjusting these positions within defined limits. Means are also provided of accurately locating and adjusting the positions of said sources of radiation and detectors with regard to one or more standard samples or test pieces in each case.

The standard sample monitoring phase of the operation may be accomplished by the use of any number of conventional methods. In accordance with a preferred embodiment, the radiation source and detector pairs 8, 10 and 12, 13 are spacially displaced from the density cell 9 and the analysis cell 11 to the position shown in dotted lines in FIGURE 1 whereby the standard samples 9' and 11' are disposed between their respective source and detector. The mechanical means for effecting such displacement are well known and are not shown herein for the purpose of clarity. It is to be understood that instead of moving the sources and detectors, the density gauge cell and the analysis chamber may be moved and replaced by the standard samples.

The radiation detectors are in electrical connection with known electronic means for measuring the radiation apprehended by them and of displaying such measurements in either analogue or digital form or both. Known electronic means may also be provided for combining the measurements from two or more detectors, for example those from the density gauge and the one or more analysis cells or conduits to derive a single parameter related to the composition of the material under examination.

Known electronic means are also provided for comparing the measurements obtained with unknown sample materials with those obtained with standard samples or test pieces of known characteristics and for deriving indices of the relative compositions of said unknown samples to the compositions of the known standards. In accordance with a preferred embodiment of the present invention, the radiation detected by detectors 10 and 13, which is essentially in pulse form, is converted at 10' and 13' to a digital representation by any well known apparatus such as shift registers and the like. The digital signals thus generated are stored in digital comparators 10" and 13" of any suitable and well known design, the details of which form no part of the present invention and therefor will not be discussed herein.

In accordance with well known digital data processing techniques, the comparators 10" and 13" are effective to generate a digital signal representing the ratio between the reference and sample monitoring steps which is then finally compared in the digital comparator 40 as a correct indication of the material present in the sample.

Time delay means may be provided between the comparator 10" and the comparator 40 to delay the density signal a given amount of time such that the apparatus is then effective to compare signals representing the same volume of slurry. This time delay would, of course, be dependent on the flow rate and the distance between the density gauge 9 and the analysis chamber 11. It has been found, however, that the density is a parameter which undergoes limited variations over long time intervals and therefore the time delay feature is not required.

The digital data handling apparatus disclosed may, of course, be replaced by suitable equivalent digital apparatus or analog data handling equipment which is conventional and well known to those skilled in the art. The parts of the described apparatus which are in contact with the slurry during operation are conveniently constructed of some corrosion and abrasion resistant material such as stainless steel or reinforced plastic material, except for the thin windows previously mentioned.

The whole apparatus is shielded by suitable materials to eliminate personal hazard from radiation and to ensure proper functioning of the radiation detectors.

To operate the described apparatus the slurry to be tested is introduced into the mixing tank and caused to flow through the circulating system, either in a closed loop, that is when the slurry leaving the last analysis cell is fed back into the mixing tank and re-circulated, or in open circuit, that is when the slurry leaving the last analysis cell is discharged from the measuring circuit. In the latter case fresh slurry is fed into the mixing tank via the constant level device at the same rate as the slurry which has passed through the apparatus is discharged. In FIGURE 1, 16 indicates the entry of slurry into the apparatus and 17 the discharge of slurry from the apparatus.

Using the flow control means provided, the velocity of the slurry through the density gauge and analysis cell or conduit is adjusted to a value which ensures that no sedimentation takes place in the measuring circuit and that the solid particles entering into the field of the radiometric intersections are representative of the overall composition of the solids in the sample, having regard for effects due to differences in the size and specific gravity of said particles.

The sources of radiation and detectors are then accurately located in known predetermined positions with regard to the windows of the density gauge and the analysis cell or cells. In these circumstances readings obtained from appropriate electronic equipment connected to the detectors may be used to give an accurate continuous indication of changes in the characteristics of the slurry passing through the apparatus since all the criteria for accurate measurement are satisfied.

Further comparison of said readings with those obtained when the apparatus is adjusted so that standard samples or test pieces are similarly disposed in accurately known positions relative to the sources of radiation and the detectors, permit the accurate interpretation of the first readings in terms of the composition of the unknown material.

One particular advantage of the apparatus is that it permits integration of the instrument readings over any desired period of time, so as to eliminate errors due to statistical fluctuations.

A further advantage lies in the fact that the apparatus permits the simultaneous use of information from two or more interactions carried out in sequence as the material is made to pass adjacent two or more radiation sources and their appropriate detection equipment. The results of these different interactions may be indicated separately or they may be combined electronically to give a single indication of a desired parameter.

It is to be understood that the above description relates only to one form of apparatus and the scope of the invention is not limited by this. Many alternative forms within the scope of the appended claims are possible showing various differences in detail from that described. In particular, the design of the analysis cell or conduit is susceptible to numerous modifications to meet the requirements of specific applications. For example, in certain circumstances it may be desired to make analytical radiometric measurements simultaneously in more than one of the three methods referred to hereinbefore using incident radiation from the same source. In this case a form of analysis cell having windows on two opposite sides must be used.

Further, when non-dispersive, radioisotope fluorescence measurements are being made, it may be advantageous to arrange for one measuring head comprising a source or sources of radiation and a detector with or without a filter assembly, all arranged in an appropriate geometrical configuration, to scan a number of analysis cells in sequence. This can be achieved relatively easily and cheaply in view of the comparative simplicity of this form of measuring head in comparison with the equivalent conventional X-ray fluorescence equipment, which includes an X-ray tube connected to a stabilised source of high voltage electric current with at least one collimator, analysing crystal unit and radiation detector.

I claim:
1. A method of carrying out radiometric analysis of fine solids suspended in a liquid, including the steps of feeding the suspension into a mixing tank and subjecting it therein to slow speed agitation, causing said suspension to flow through a density gauge wherein it is caused to interact with a beam of electromagnetic radiation, the photons of which principally have energies in the range 600–3000 kilo electron volts, the length of the flow path through said gauge being such as to provide optimum conditions for the measurement of the attenuation of said beam of radiation according to known principles and the velocity of flow being such as to maintain the solids in homogeneous suspension, measuring the intensity of the radiation transmitted through the suspension in said density gauge; comparing said measurement with a measurement of the intensity of the radiation transmitted through a reference standard under similar conditions to deduce the density of the suspension; causing said suspension to flow through chamber means under conditions of controlled pressure, velocity and flow pattern, wherein said suspension is caused to interact with primary radiation incident upon it from a source of primary radiation, measuring by means of a detector the radiation resulting from said interaction, the relative positions of the source of primary radiation, the chamber means and the radiation detector being accurately maintained during said measurement, comparing said resultant radiation with that produced during interaction between incident radiation from the same source and a reference standard of known characteristics under similar conditions and combining the results of these latter measurements of resultant radiation with the results obtained from the density gauge measurements so as to allow for variations in the solids content of the sample material to obtain information relating to the chemical composition of the solids present in the suspension.

2. A method as claimed in claim 1 wherein the subjection of the suspension in the mixing tank to slow speed agitation is accompanied by the application of reduced pressure.

3. A method as claimed in claim 1 wherein at least one of the sources of radiation employed consists of a suitably shielded preparation of radioisotope material.

4. A method as claimed in claim 3 wherein the preparation is used with a target.

5. A method as claimed in claim 3 wherein the source of the radiation associated with the sample material includes a preparation of an isotope selected from the group consisting of:

$$3_H, 55_{Fe}, 85_{Sr}, 109_{Cd}, 147_{Pm}, 241_{Am}$$

6. A method as claimed in claim 1 wherein the source of radiation used in conjunction with the density gauge consists of a preparation of radioisotope material provided with protective and collimated shielding.

7. A method as claimed in claim 5 wherein the source of radiation consists of a preparation of the radioisotope casesium–137.

8. A method as claimed in claim 1 wherein at least one of the conditions consisting of the flow path and the velocity gradient of the suspension through the chamber means is adjusted so as to provide at least partial compensation for known particle size effects.

9. Apparatus for carrying out radiometric analysis of fine solids suspended in a liquid including a mixing tank which is provided with means for the slow speed agitation of the suspension therein, and is in communication with a circulating system incorporating a slurry circulating pump, a density gauge assembly and chamber means, said system being provided with means whereby the flow through, said pressure within, the chamber means may be controlled; means for projecting a collimated beam of electromagnetic radiation composed principally of photons having energies in the range 600–3000 kilo electron volts through the said density gauge, while the said suspension is flowing through the latter, the length of the flow path through said gauge being such as to provide optimum conditions for the measurement of the attenuation of said beam of radiation according to known principles and the velocity of flow being such as to maintain the solids in homogeneous suspension, means for measuring the intensity of radiation transmitted through the suspension in said density gauge, means for comparing the attenuation so produced with the attenuation of the same beam of radiation produced by a suitable reference standard; means including a source of primary radiation and a radiation detector for causing interaction to take place between the suspension flowing through the chamber means and primary radiation incident upon said suspension, means for measuring the resultant radiation under conditions whereby the relative positions of the source of primary radiation, the chamber means and the radiation detector are accurately maintained during said measurement, means for comparing this measurement with that of the resultant radiation produced when a reference standard of known characteristics is irradiated in like manner by the same source of radiation under similar geometrical conditions, and means for combining the results of these latter measurements of resultant radiation with results obtained from the density gauge measurements so as to allow for variations in the solids content of the sample material to obtain information relating to the chemical composition of the solids present in the suspension.

10. Apparatus as claimed in claim 9, wherein a straining gauze is fitted into the mixing tank, which incorporates a bladed paddle for wiping the said straining gauze to prevent clogging during the operation of the apparatus.

11. Apparatus as claimed in claim 9, wherein the mixing tank, which is provided with a sealed lid, is in communication with a source of reduced pressure and is provided with means for introducing into the tank the suspension via a constant level device without the admission of air.

12. Apparatus as claimed in claim 9, wherein the density gauge assembly includes a tube of substantially constant bore closed at each end by windows having a low mass absorption coefficient for gamma rays, and being provided with side arms through which the suspension respectively enters and leaves the gauge during operation of the apparatus in such a way that said tube is maintained fully charged with flowing suspension, the bore of the tube being such as to prevent sedimentation or segregation of the suspension taking place therein and the length of said tube being such as to provide optimum conditions for the radiation attenuation measurement according to known principles.

13. Apparatus as claimed in claim 12, wherein the tube is composed of a number of separate sections capable of being assembled in various combinations so that the tube length may be accurately adjusted by defined increments to give the required optimum value.

14. Apparatus as claimed in claim 9, wherein the pressure control means include a by-pass in communication with the main flow stream via a diaphragm pressure relief valve.

15. Apparatus as claimed in claim 9 wherein the source of the radiation projected through the density gauge consists of a preparation of radioisotope material provided with protective and collimating shielding.

16. Apparatus as claimed in claim 15, wherein the radiation source consists of a preparation of the radioisotope caesium-137.

17. Apparatus as claimed in claim 9 wherein the chamber means is provided with means whereby at least one of the conditions consisting of the flow path and the velocity gradient of the suspension flowing through said chamber means may be adjusted to provide at least partial compensation for known particle size effects.

18. Apparatus as claimed in claim 17, wherein the adjustment means consists of a movable piston or plunger which co-operates with an elastic diaphragm so as to control the cross section and shape of the flow path of the suspension within the said chamber means.

19. Apparatus as claimed in claim 9, wherein the source of radiation incident upon the suspension in the chamber means consists of a preparation of radioisotope material provided with suitable shielding.

20. Apparatus as claimed in claim 19, wherein the radioisotope material is provided with a target.

21. Apparatus as claimed in claim 19, wherein the radioisotope material is selected from the group consisting of tritium, iron-55, strondium-85, cadmium-109, promethium-147, americium-241.

References Cited

UNITED STATES PATENTS

| 3,204,097 | 8/1965 | Moffat et al. | 250—51.5 |
| 3,259,743 | 7/1966 | Pick et al. | 250—51.5 |

RALPH G. NILSON, Primary Examiner

A. L. BIRCH, Assistant Examiner

U.S. Cl. X.R.

250—51.5